United States Patent [19]
Yoneyama

[11] Patent Number: 5,570,235
[45] Date of Patent: Oct. 29, 1996

[54] COMPACT ZOOM LENS

[75] Inventor: Shuji Yoneyama, Tokyo, Japan

[73] Assignee: Asahi Kogaku Kogyo Kabushiki Kaisha, Tokyo, Japan

[21] Appl. No.: 299,424

[22] Filed: Sep. 1, 1994

[30] Foreign Application Priority Data

Sep. 2, 1993 [JP] Japan .................... 5-218399

[51] Int. Cl.$^6$ ........................... G02B 15/14; G02B 13/18
[52] U.S. Cl. ........................................ 359/692; 359/713
[58] Field of Search ........................... 359/692, 690, 359/688, 687, 683, 708, 713

[56] References Cited

U.S. PATENT DOCUMENTS

| | | | |
|---|---|---|---|
| 4,720,179 | 1/1988 | Ito | 359/692 |
| 4,770,516 | 9/1988 | Yamagata | 359/745 |
| 4,836,660 | 6/1989 | Ito | 359/692 |
| 4,984,877 | 1/1991 | Ito | 359/692 |
| 5,278,699 | 1/1994 | Ito et al. | 359/692 |
| 5,353,162 | 10/1994 | Ito et al. | 359/692 |

FOREIGN PATENT DOCUMENTS

| | | |
|---|---|---|
| 4134410 | 5/1992 | Japan . |
| 5-11186 | 1/1993 | Japan . |

*Primary Examiner*—Scott J. Sugarman
*Attorney, Agent, or Firm*—Greenblum & Bernstein P.L.C.

[57] ABSTRACT

A compact zoom lens has two lens groups including a first lens group having a positive refractive power and a second lens group having a negative refractive power, arranged in this order from an object. The second lens group is provided with a first lens made of a positive meniscus lens with a concave surface located adjacent to an object to be photographed, and a second negative lens with a concave surface adjacent to the object. The compact zoom lens satisfies the relationships defined by:

(1) $1.9 < f_w/r_1$
(2) $3.4 < f_T/f_1 < 4$, and
(3) $0.5 < f_T/f_{2-1} < 1.2$, wherein $f_w$ designates the focal length of the whole lens system at a wide-angle extremity, $r_1$ the radius of curvature of the surface of the first lens, $f_T$ the focal length of the whole lens system at a telephoto extremity, $f_1$ the focal length of the first lens group, and $f_{2-1}$ the focal length of the first lens of the second lens group.

6 Claims, 9 Drawing Sheets

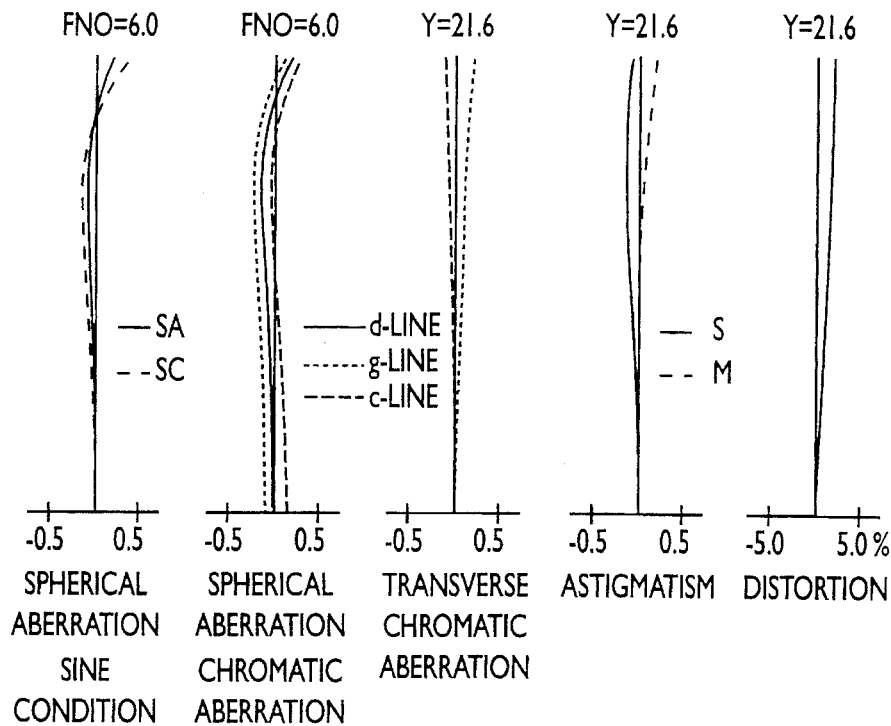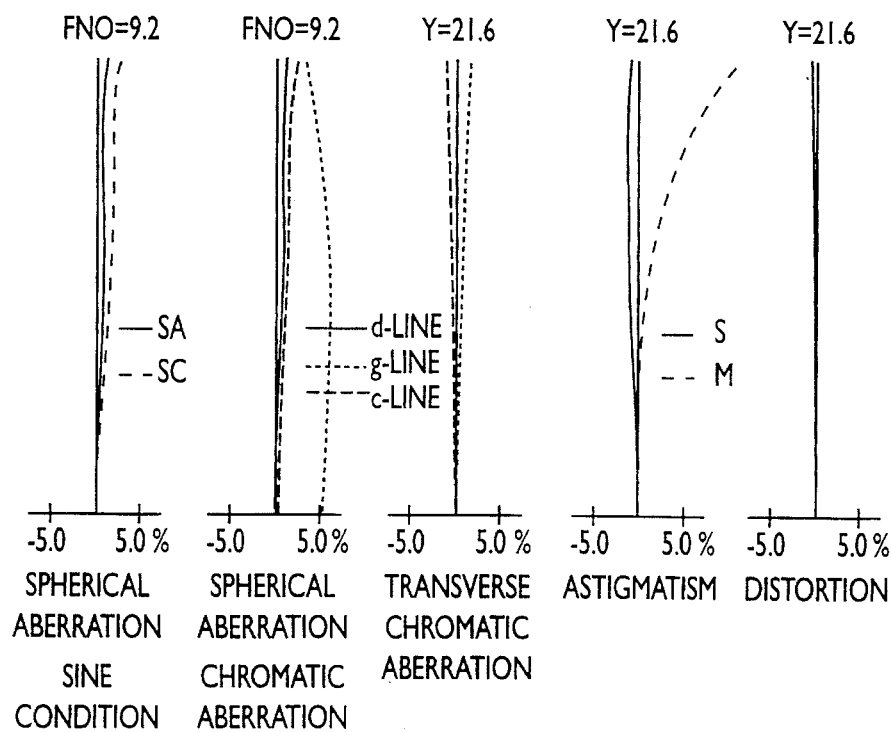

FNO=4.3

-0.5  0.5

SPHERICAL
ABERRATION

SINE
CONDITION

— SA
- - SC

FNO=4.3

-0.5  0.5

SPHERICAL
ABERRATION

CHROMATIC
ABERRATION

— d-LINE
······ g-LINE
- - - - c-LINE

Y=21.6

-0.5  0.5

TRANSVERSE
CHROMATIC
ABERRATION

Y=21.6

-0.5  0.5

ASTIGMATISM

— S
- - M

Y=21.6

-5.0  5.0%

DISTORTION

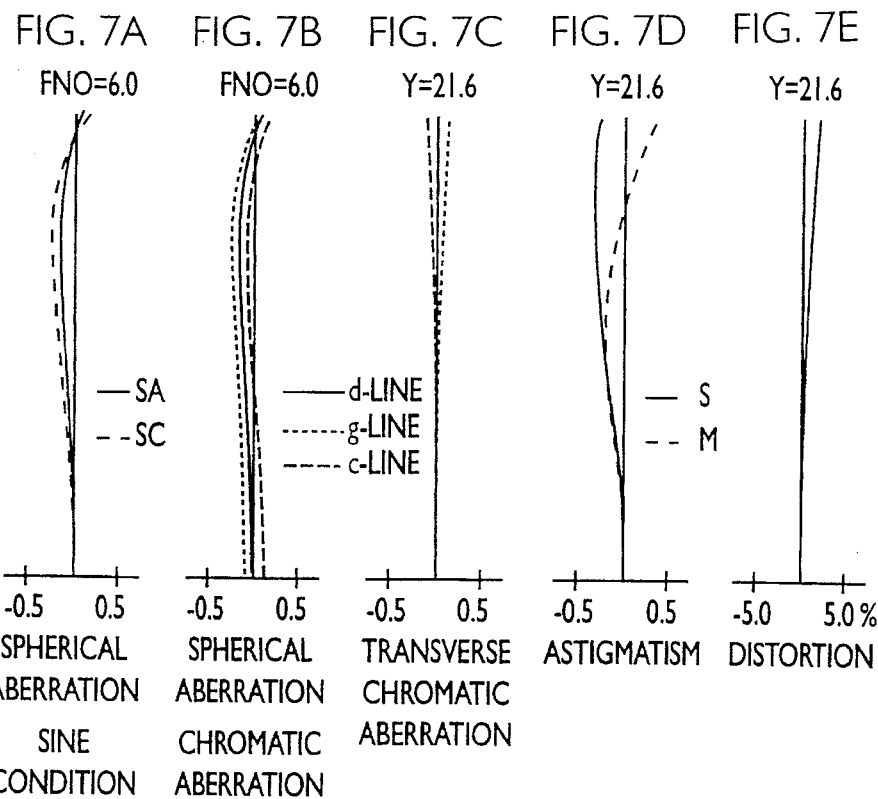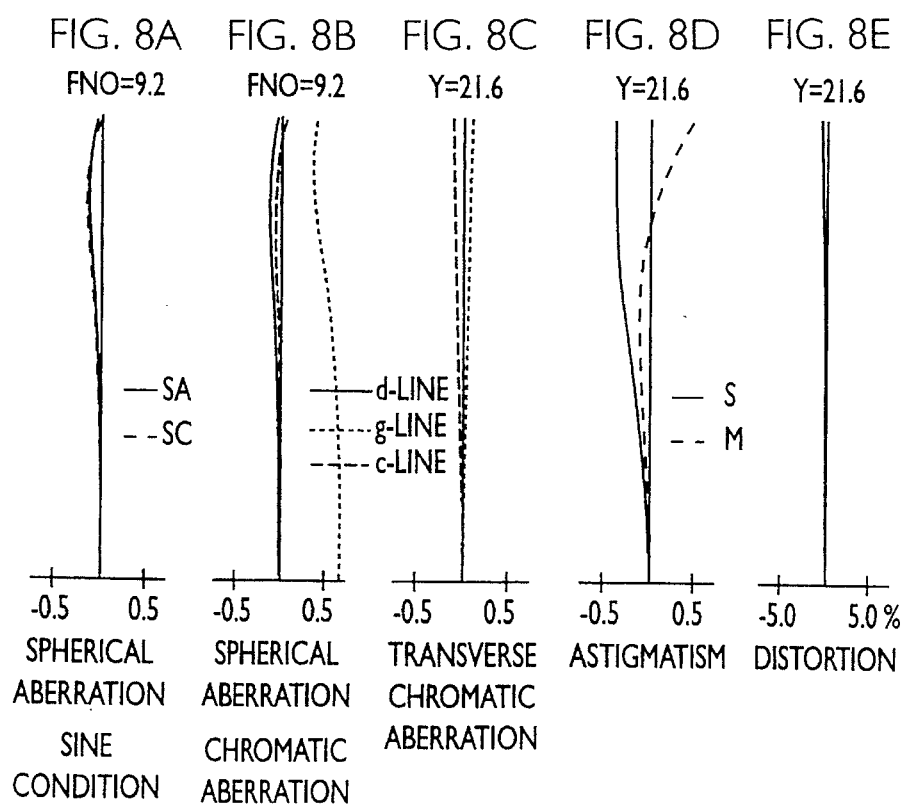

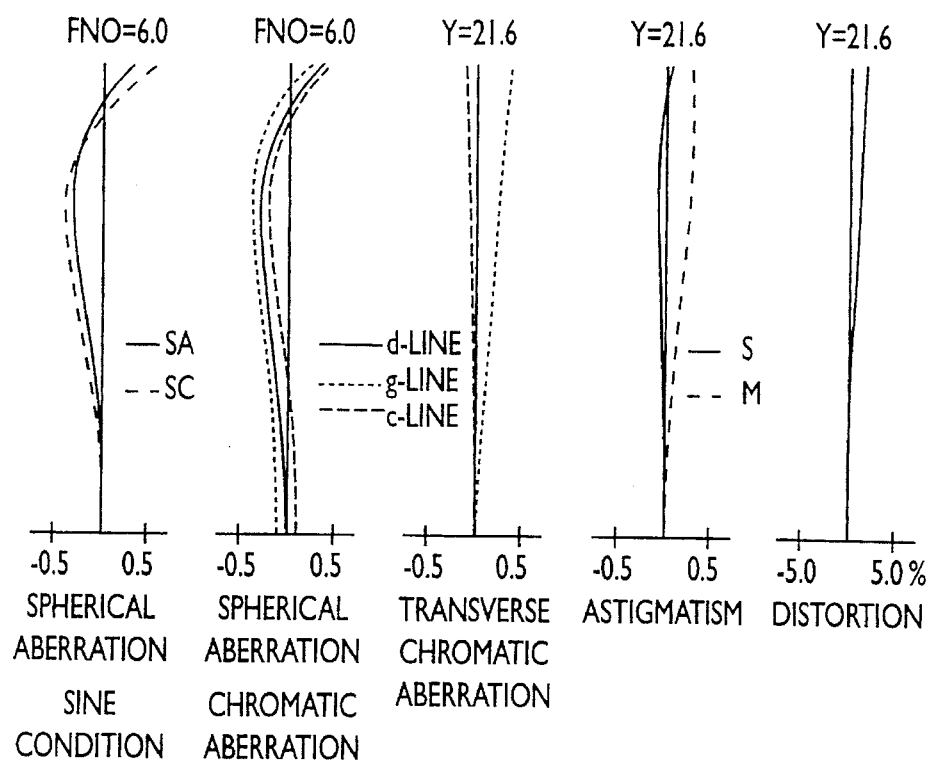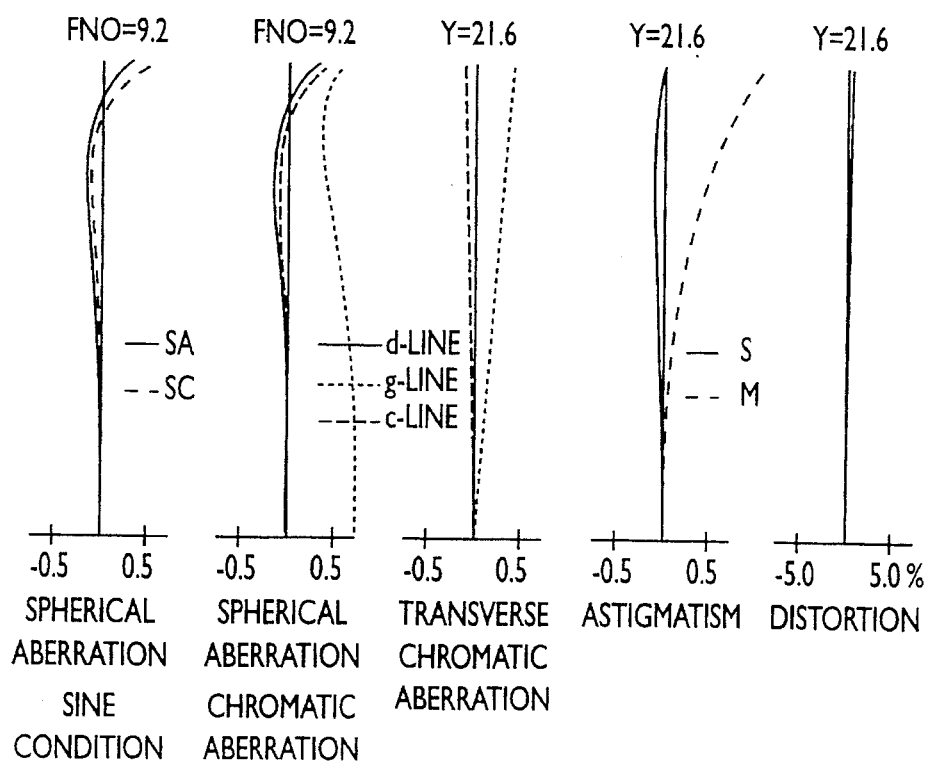

FIG. 13
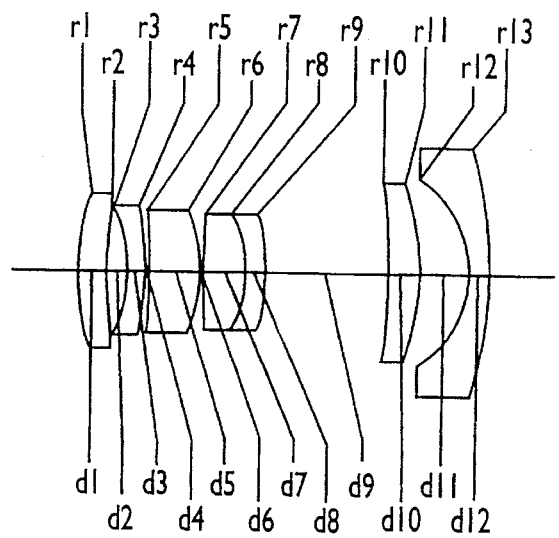
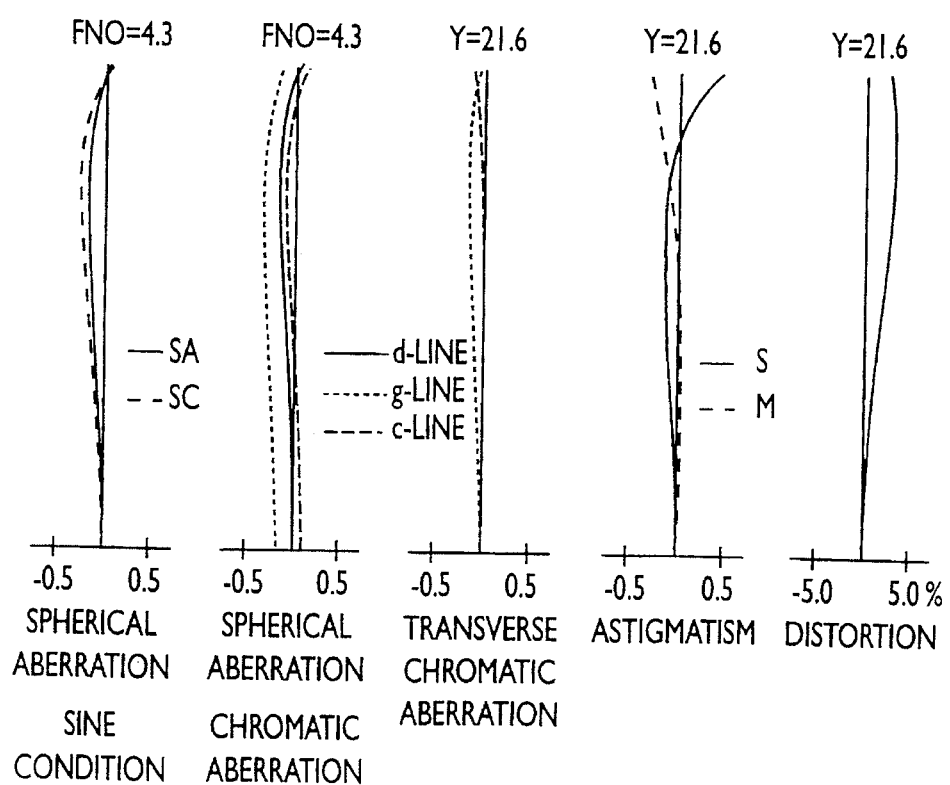
FIG. 14A   FIG. 14B   FIG. 14C   FIG. 14D   FIG. 14E
FNO=4.3   FNO=4.3   Y=21.6   Y=21.6   Y=21.6
— SA
- - SC
—— d-LINE
------ g-LINE
---- c-LINE
— S
-- M
-0.5   0.5   -0.5   0.5   -0.5   0.5   -0.5   0.5   -5.0   5.0 %
SPHERICAL   SPHERICAL   TRANSVERSE   ASTIGMATISM   DISTORTION
ABERRATION   ABERRATION   CHROMATIC
SINE   CHROMATIC   ABERRATION
CONDITION   ABERRATION

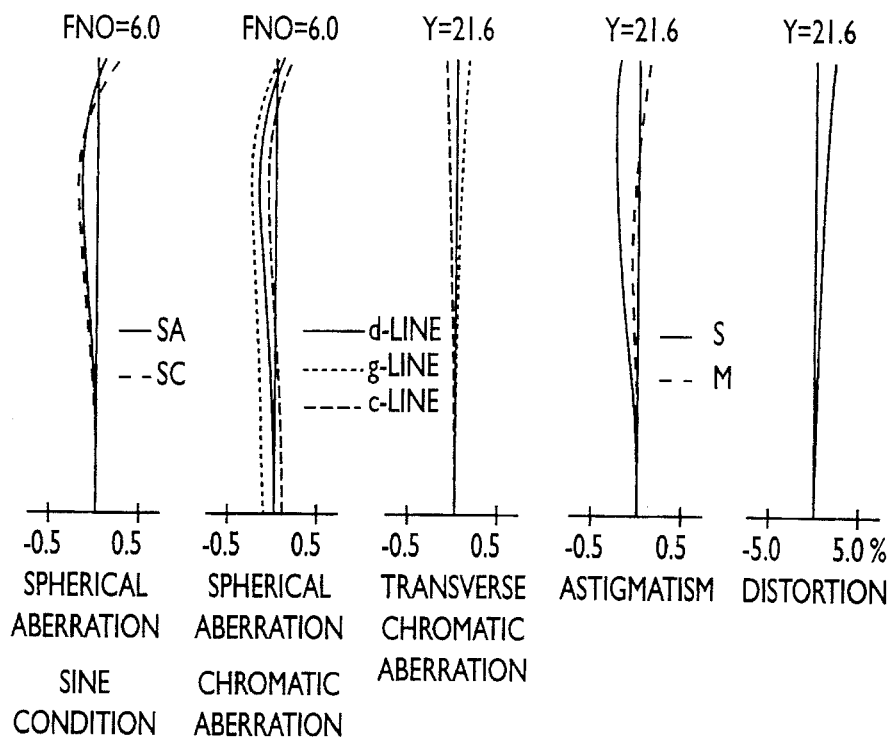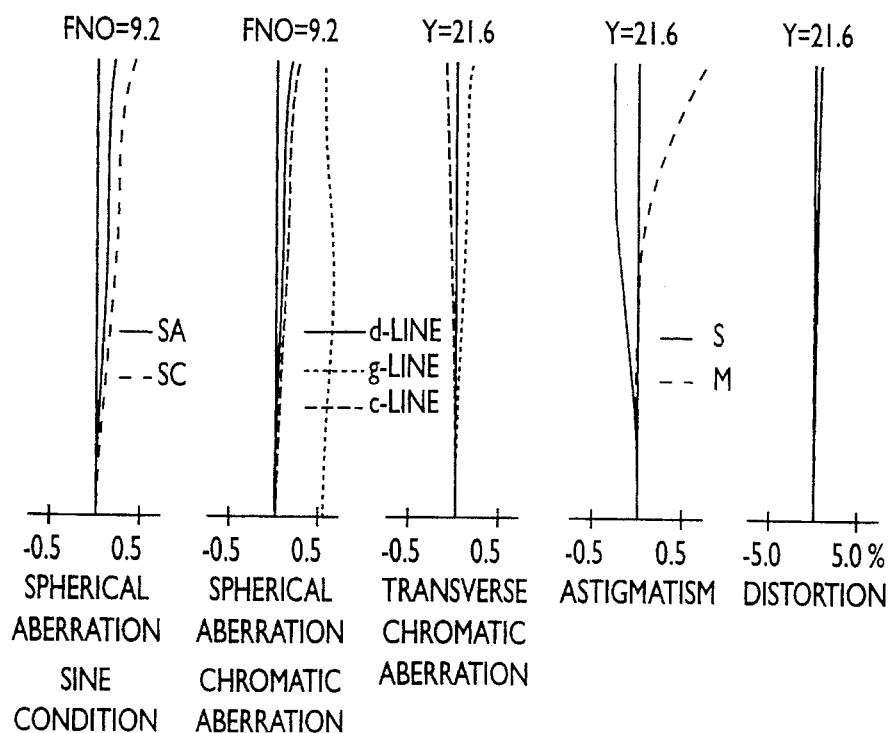

COMPACT ZOOM LENS

BACKGROUND OF THE INVENTION

1. Field of the Invention

The present invention relates to a compact zoom lens which can be advantageously used for a lens shutter type camera in which the back focal distance is less than that of a single lens reflex camera.

2. Description of Related Art

Zoom lenses for a lens shutter type camera, typically have two lens groups whose zooming ratio is approximately 2. For example, Japanese Patent Kokai Publication No. 4-134410 or 5-11186 discloses a compact zoom lens with two lens groups and a telephoto ratio at the telephoto extremity ((total length of the lens system+back-focal distance, at the telephoto extremity)/(focal length of the lens system at the telephoto extremity)) below 1. There has long been a need for realizing a more compact zoom lens with an increased variable power.

SUMMARY OF THE INVENTION

It is an object of the present invention to provide a compact zoom lens with a zooming ratio greater than 2.1 to improve image quality, and a telephoto ratio below 0.9 at the telephoto extremity.

To achieve the object mentioned above, the present invention provides a compact zoom lens system including a first lens group having a positive refractive power and a second lens group having a negative refractive power, arranged in this order from an object side. The first and second lens groups are movable and change their spatial distance in carrying out a zooming operation. The second lens group has a first lens made of a positive meniscus lens with a concave surface located adjacent to an object to be photographed, and a second negative lens with a concave surface located adjacent to an object to be photographed, arranged in this order from the object side. The compact zooms lens of the present invention satisfies the following relationships $$1.9 < f_w/r_1 \tag{1}$$

$$3.4 < f_T/f_1 < 4 \tag{2}$$

$$0.5 < f_T/f_{2-1} < 1.2 \tag{3}$$

where $f_w$ represents a focal length of the lens system at the wide-angle extremity;

$r_1$ represents a radius of curvature of the first lens surface located adjacent to the object to be photographed;

$f_T$ represents a focal length of the lens system at the telephoto extremity;

$f_1$ represents a focal length of the first lens group;

$f_{2-1}$ represents a focal length of the first lens of the second lens group.

Preferably, the first lens of the second lens group is a plastic lens with an aspheric surface. Further, the aspheric surface of the first lens of the second lens group is located adjacent to the object to be photographed and the second lens group satisfies the following relationships $$0.005 < \Delta X_1/f_w < 0.012 \tag{4}$$

$$-2.8 < f_T/f_{2-2} < -2.1 \tag{5}$$

where $\Delta X_1$ represents an amount of aspheric deviation of the lens surface of the first lens of the second lens group located adjacent to an object to be photographed at the largest radius within an effective area of the lens;

$f_{2-2}$ represents a focal length of the second lens of the second lens group.

Preferably, the first lens group has a first lens made of a positive meniscus lens whose convex surface is located adjacent to an object to be photographed, a second lens made of a negative meniscus lens whose concave surface is located adjacent to an object to be photographed, a third lens made of a positive lens having a larger curvature of convex surface located adjacent to an image surface on which an image is to be formed, and a cemented lens with a fourth positive lens and a fifth negative lens, arranged in this order from the object side. In this arrangement, the following relationships are satisfied $$-10 < v_{1-4} - v_{1-5} < 10 \tag{6}$$

$$n_{1-5} - n_{1-4} > 0.2 \tag{7}$$

where $v_{1-4}$ represents a Abbe number of the fourth lens belonging to the first lens group;

$v_{1-5}$ represents a Abbe number of the fifth lens belonging to the first lens group;

$n_{1-5}$ represents a refractive index of the fifth lens belonging to the first lens group at the d-line;

$n_{1-4}$ represents a refractive index of the fourth lens belonging to the first lens group at the d-line.

The present disclosure relates to subject matter contained in Japanese patent application No. 5-218399 (filed on Sep. 2, 1993) which is expressly incorporated herein by reference in its entirety.

BRIEF DESCRIPTION OF THE DRAWINGS

The invention will be described below in detail with reference to the accompanying drawings, in which;

FIG. 3 shows various aberration diagrams of a small zoom lens shown in FIG. 1;

FIG. 4 shows various aberration diagrams of a small zoom lens shown in FIG. 1;

FIG. 7 shows various aberration diagrams of a small zoom lens shown in FIG. 5;

FIG. 8 shows various aberration diagrams of a small zoom lens shown in FIG. 5;

FIG. 11 shows various aberration diagrams of a small zoom lens shown in FIG. 9; and, FIG. 12 shows various aberration diagrams of a small zoom lens shown in FIG. 9.

FIG. 13 is a schematic view of a lens arrangement of a small zoom lens at a wide-angle extremity, according to a fourth embodiment of the present invention;

FIG. 14 shows various aberration diagrams of a small zoom lens shown in FIG. 13;

FIG. 15 shows various aberration diagrams of a small zoom lens shown in FIG. 13; and, FIG. 16 shows various aberration diagrams of a small zoom lens shown in FIG. 13.

DESCRIPTION OF THE PREFERRED EMBODIMENT

Figure 1:
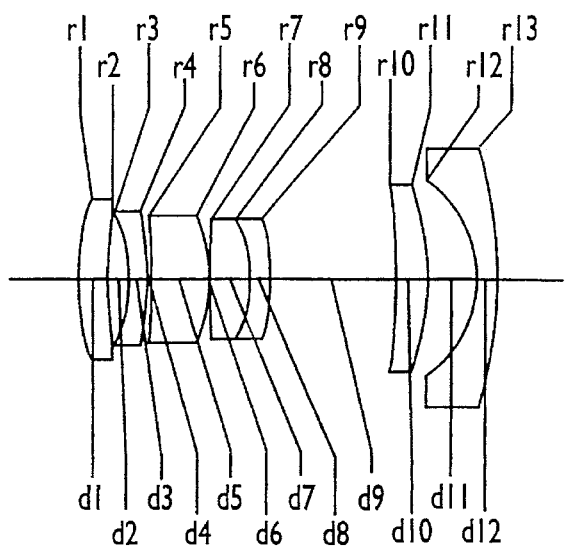
FIG. 1 is a schematic view of a lens arrangement of a small zoom lens at a wide-angle extremity, according to a first embodiment of the present invention.

In a telephoto type zoom lens which has two lens groups namely a first positive lens group and a second negative lens group, is well known, the zoom lens can be miniaturized by increasing the refractive power of each lens group or shortening the lens length of each lens group.

According to the basic concept of the present invention, the refractive power of one of the two lens groups, particularly a first lens group, is large, and a second lens group has two lenses to reduce the lens length to obtain a compact zoom lens. In such a lens arrangement where the second lens group has two lenses, there is a tendency that astigmatism and distortion are increased. However, according to the present invention, a first lens of the second lens group is provided with an aspheric surface to effectively correct astigmatism and distortion. Moreover, the first lens of the second lens group is preferably made of plastic to keep the manufacturing cost of the zoom lens low.

The formula (1) specifies the radius of curvature of the first lens surface. If the value of $r_1$ is selected such that the ratio of $fw/r_1$ is less than or equal to the lower limit, the refractive power of the first lens surface is too weak, increasing the back-focal distance, leading to an increase in the entire length of the lens groups.

The formula (2) specifies the refractive power of the first lens group. If the refractive power is less than or equal to the lower limit, the magnification of the second lens group is reduced, resulting in the back-focal distance at the wide-angle extremity to be unacceptably short. If the back-focal distance is shortened, the diameter of the lens of the second lens group located adjacent to an image to be formed must be increased, resulting in a large camera. Conversely, if the refractive power of the first lens group is greater than or equal to the upper limit, the entire length of the lens groups can be advantageously decreased, but the aberration in the first lens group cannot be effectively eliminated. This also increases the magnification of the second lens group, those magnifying the aberration that has not been eliminated in the first lens group. Consequently, it is difficult to correct the aberration of the whole lens system over the entire zoom range.

The formula (3) specifies the refractive power of the first lens of the second lens group. If the refractive power is less than or equal to the lower limit, the second lens group's negative refractive power results in the entire zoom lens having a positive spherical aberration and a negative Petzval sum. However, the negative spherical aberration and the positive Petzval sum of the first positive lens of the second lens group are reduced, so that the aberration cannot be completely eliminated within the second lens group.

Conversely, if the refractive power of the first lens of the second lens group is greater than or equal to the upper limit, the back-focal length can be significantly influenced by a change in temperature and humidity, etc., since the first lens of the second lens group is a plastic lens whose refractive power tends to vary with temperature and humidity, etc. Furthermore, if the refractive power is large, the error sensitivity is increased, so that the aspheric surface provided on the first lens of the second lens group must be very precise, however, it is very difficult to produce such a highly precise aspheric surface.

The formula (4) specifies the amount of aspheric deviation of the lens surface of the first lens of the second lens group adjacent to the object to be photographed. Since the second lens group consists of both a positive lens and a negative lens, the refractive power of the second lens of the second lens group is large, and accordingly, an excessive positive distortion exists at the wide-angle extremity. The aspheric surface of the first lens of the second lens group adjacent to the object is such that the thickness of the lens decreases and the power increases as the height from the optical axis increases to correct the distortion caused by the negative second lens of the second lens group. At the telephoto position, the surface of the first lens of the second lens group adjacent to the object is positioned directly behind a diaphragm to correct the spherical aberration which tends to become positive due to the variation of the aberration during the zooming. If the amount of the aspheric deviation is less than or equal to the lower limit in formula (4), the change in the power is too small to correct for the positive distortion at the wide-angle extremity. Conversely, if the amount of the aspheric deviation is greater than or equal to the upper limit in formula (4), a high-order spherical aberration too large to eliminate occurs at the telephoto extremity.

The reason that the concave surface of the first lens of the second lens group adjacent to the object to be photographed is preferably an aspheric surface is as follows:

To correct positive distortion, it is necessary to increase the positive power of the lens as the height thereof from the optical axis increases. Namely, it is necessary to make the value of $\Delta X_1$ positive to satisfy the requirements defined in formula (4). However, since the concave surface of the first lens of the second lens group adjacent to the object is an aspherical surface, the spherical surface component and the aspherical surface component have different signs. Consequently, the spherical aberration or comatic aberration can be less sensitive to a possible error in the shape or deviation of the aspheric surface, etc.

Conversely, if the convex surface of the first lens of the second lens group adjacent to the image to be formed is an aspheric surface, the sign of the spherical surface component is identical to the sign of the aspherical surface component. Consequently, when the distortion is corrected, the positive power increases as the height from the optical axis increases, so that it is difficult to correct the spherical aberration and the comatic aberration. Even if the spherical aberration and a comatic aberration are corrected by the balance between the first lens of the second lens group and the other lenses, deterioration of the quality due to the error in the shape of the aspheric surface and the deviation thereof, etc., is not acceptable.

Figure 17:
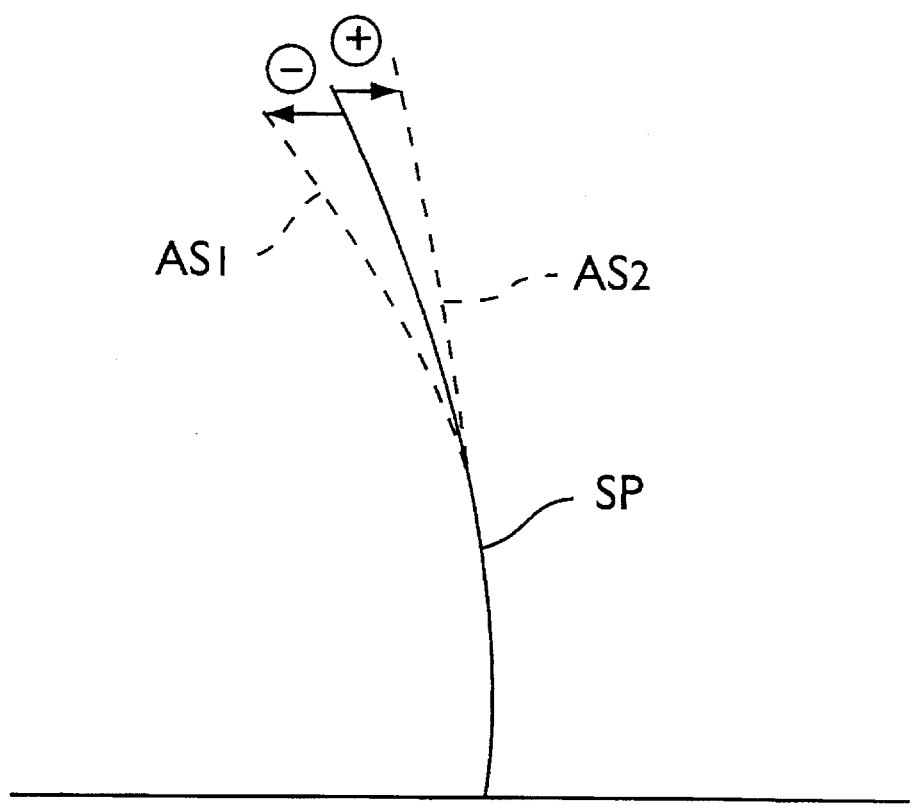
FIG. 17 is an explanatory view of the signs of aspherical deviation of a lens.

Note that for a negative value for $\Delta X_1$, as shown in FIG. 17, the aspherical lens surface $AS_1$, which is located at the object side (left in FIG. 17) of the lens in contrast to a basic spherical surface SP on which the aspherical lens surface $AS_1$ is formed. If $\Delta X_1$ is positive, the aspherical lens surface $AS_2$ is located at the image side (right in FIG. 17) of the basic spherical surface SP. The sign for a spherical surface when it is located at the image side, is positive, and in the case where the center of the spherical surface is located at the object side, the sign is negative.

The formula (5) specifies the refractive power of the second lens of the second lens group. If the refractive power is greater than or is equal to the upper limit (i.e., the refractive power is too weak), the displacement of the second lens group which is determined in connection with the requirement defined in formula (3) increases, so that the length of the entire lens system at the telephoto extremity is too long to realize a compact camera. Conversely, if the refractive power is greater than or is equal to the lower limit (i.e., the refractive power is too strong), the refractive power of the second lens group can be increased, which is preferable from the viewpoint of the compactness of the zoom lens, but the distortion and the curvature of the field at the wide-angle extremity are too large to be effectively eliminated.

The formula (6) is related to the correction of the chromatic aberration. In a zoom lens, the chromatic aberration is corrected in each lens group to restrict the fluctuation of the chromatic aberration during the zooming operation. In the present invention, the refractive powers of the lenses of the second lens group are specified by the formulae (3) and (5), as mentioned above. Since the first lens of the second lens group is made of plastic, the chromatic aberration of the second lens group is substantially determined. Therefore, the fourth lens and the fifth lens of the cemented lens in the first lens group are set so as to meet the requirements defined by the formula (6), so that the chromatic aberration of the entire lens system at the telephoto position and at the wide-angle position are well balanced to be within an appropriate range. If the difference specified in formula (6) is less than or equal to the lower, limit, the g-line is displaced considerably in the negative direction at the wide-angle extremity. Conversely, if the difference is greater than or equal to the upper limit, the g-line is displaced considerably in the positive direction at the telephoto position.

The formula (7) specifies a difference in the refractive index between the fourth and fifth lenses of the first lens group. The reason that there is a large difference in the refractive index between the fourth and fifth lenses cemented to each other, specified in formula (7), is to correct the spherical aberration caused by the increased refractive power of the first lens group, specified in formula (2). If the difference in the refractive index is less than or equal to the lower limit, it is impossible to increase the refractive power of the connection surface of the cemented lenses to a value large enough to correct the spherical aberration.

First Embodiment

FIG. 1 shows a lens arrangement of a compact zoom lens at a wide-angle extremity, according to a first embodiment of the present invention.

The back-focal distance $f_B$ of a zoom lens according to the present invention is an optimum value, as specified in formulae (1) and (2), etc., and satisfies the following relationship in connection with the focal length $f_w$ of the entire lens system at the wide-angle extremity;

$$0.2 < f_B/f_w < 0.4$$

If the ratio of $f_B/f_w$ exceeds the upper limit, it is difficult to meet the compactness requirements. If the ratio is less than the lower limit, which contributes to a miniaturization of the zoom lens, the diameter of the second lens group must be increased to minimize the influence that an image of a foreign matter, such as a dust, applied to the rear end surface of the lens, etc., has on a picture.

Numerical data for the zoom lens system shown in FIG. 1 is shown in Table 1 below. Diagrams of various aberrations thereof at the wide-angle extremity, a standard position and a telephoto extremity are shown in FIGS. 2, 3 and 4, respectively.

Figures 2A, 2B, 2C, 2D, 2E:
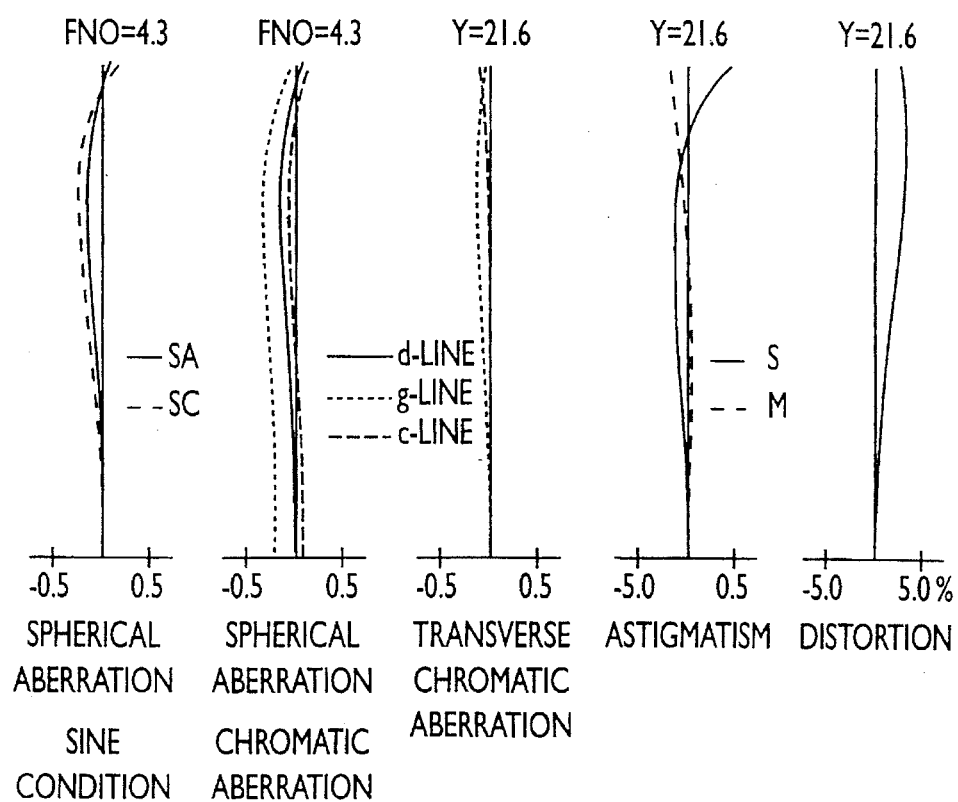
FIG. 2 shows various aberration diagrams of a small zoom lens shown in FIG. 1.

In FIGS. 2 through 4, "SA." designates the spherical aberration, "SC" the sine condition, "d-line", "g-line" and "C-line" the chromatic aberration, represented by the spherical aberration, and the transverse chromatic aberration at the respective wavelengths, "S" the sagittal ray, and "M" the meridional ray, respectively.

In the Tables and the drawings, "$F_{NO}$" designates the aperture ratio (F-number), "f" the focal length, "ω" the half angle of view, "$f_B$" the back-focal distance, "Y" the image height, "ri" the radius of curvature of each lens surface, "di" the lens thickness or the distance between the lenses, "N" the refractive index, and "ν" the Abbe number, respectively.

TABLE 1

| $F_{NO}$ = 1:4.3–6.0–9.2 | | | |
|---|---|---|---|
| f = 36.26–50.00–77.12 | | | |
| ω = 30.2–23.0–15.6 | | | |
| $f_B$ = 10.96–22.35–44.83 | | | |
| Y = 21.6 | | | |

| surface NO | r | d | N | ν |
|---|---|---|---|---|
| 1 | 16.390 | 2.10 | 1.58144 | 40.7 |
| 2 | 34.280 | 1.49 | — | — |
| 3 | −11.634 | 1.21 | 1.84666 | 23.8 |
| 4 | −24.900 | 0.31 | — | — |
| 5 | −75.994 | 4.14 | 1.51823 | 59.0 |
| 6 | −11.652 | 0.10 | — | — |
| 7 | 72.105 | 2.91 | 1.56732 | 42.8 |
| 8 | −8.600 | 1.40 | 1.83481 | 42.7 |
| 9 | −18.483 | 8.91–5.79–2.89 | — | — |
| 10✕ | −42.308 | 2.37 | 1.58547 | 29.9 |
| 11 | −21.950 | 3.67 | — | — |
| 12 | −8.483 | 1.40 | 1.80400 | 46.6 |
| 13 | −33.750 | — | — | — |

✕:marked surface is aspherical.
NO. 10: K = 0.0, A4 = 0.11264 × $10^{-3}$, A6 = 0.15322 × $10^{-5}$, A8 = 0.0, A10 = 0.0, A12 = 0.0

The shape of the aspheric surface can be generally expressed as follows.

$$X = CY^2 / \{1+[1-(1+K)C^2Y^2]^{1/2}\} + A_4Y^4 + A_6Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents a eighth-order aspherical factor, $A_{10}$ represents a tenth-order aspherical factor.

Second Embodiment

Figure 5:
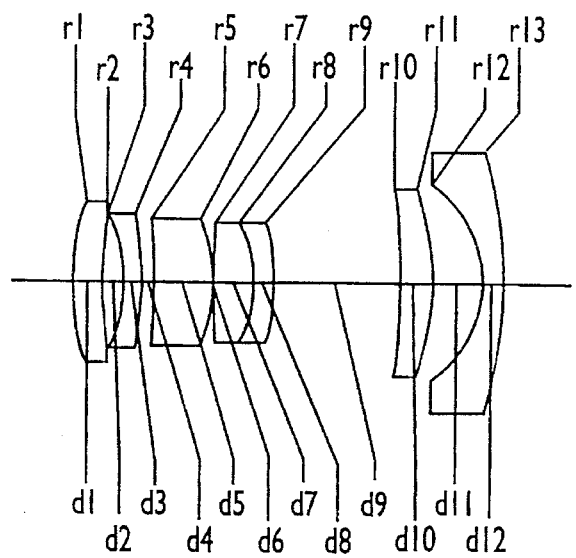
FIG. 5 is a schematic view of a lens arrangement of a small zoom lens at a wide-angle extremity, according to a second embodiment of the present invention.
Figure 6A:
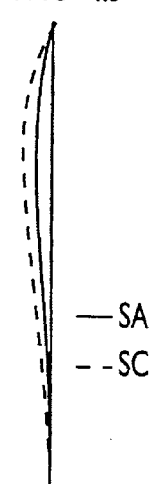
FIG. 6 shows various aberration diagrams of a small zoom lens shown in FIG. 5.
Figure 6B:
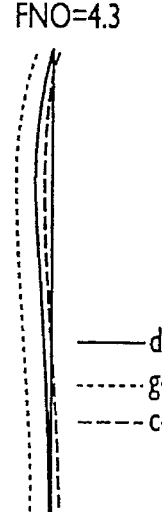
Figure 6C:
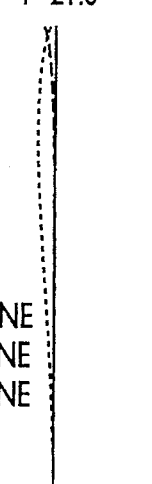
Figure 6D:
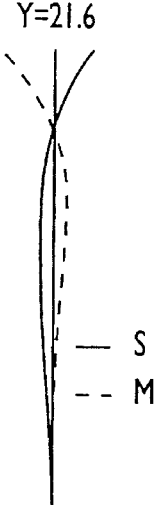
Figure 6E:
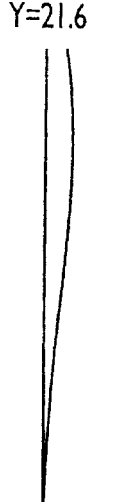

FIG. 5 shows a lens arrangement for a compact zoom lens system at the wide-angle extremity, according to a second embodiment of the present invention.

Numerical data of the lens system shown in FIG. 5 is shown in Table 2 below. Diagrams of various aberrations thereof at the wide-angle extremity, a standard position and a telephoto extremity are shown in FIGS. 6, 7 and 8, respectively.

TABLE 2

$F_{NO} = 1:4.3-6.0-9.2$
$f = 36.28-50.00-77.12$
$\omega = 30.2-23.0-15.6$
$f_B = 10.96-22.26-44.61$
$Y = 21.6$

| surface NO | r | d | N | ν |
|---|---|---|---|---|
| 1 | 17.480 | 2.12 | 1.58144 | 40.7 |
| 2 | 44.845 | 1.36 | — | — |
| 3 | −12.413 | 1.44 | 1.84666 | 23.8 |
| 4 | −30.825 | 0.88 | — | — |
| 5 | −78.309 | 3.43 | 1.50137 | 56.4 |
| 6 | −11.940 | 0.10 | — | — |
| 7 | 54.519 | 3.12 | 1.56732 | 42.8 |
| 8 | −8.963 | 1.40 | 1.83481 | 42.7 |
| 9 | 18.936 | 8.65–5.58–2.72 | — | — |
| 10⋇ | −55.042 | 2.32 | 1.58547 | 29.9 |
| 11⋇ | −27.514 | 3.89 | — | — |
| 12 | −8.575 | 1.40 | 1.80400 | 46.6 |
| 13 | −32.517 | — | — | — |

⋇marked surface is aspherical.
NO. 10: $K = 0.0$, $A4 = 0.13809 \times 10^{-3}$, $A6 = 0.16803 \times 10^{-5}$, $A8 = 0.13881 \times 10^{-8}$, $A10 = 0.0$ $A12 = 0.0$
NO. 11: $K = 0.0$, $A4 = 0.20111 \times 10^{-4}$, $A6 = 0.72824 \times 10^{-6}$, $A8 = 0.0$, $A10 = 0.0$, $A12 = 0.0$

Third Embodiment

Figure 9:
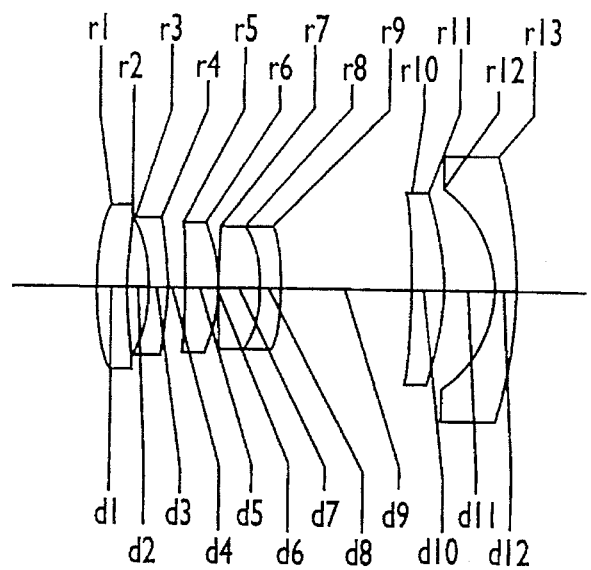
FIG. 9 is a schematic view of a lens arrangement of a small zoom lens at a wide-angle extremity, according to a third embodiment of the present invention.

FIG. 9 shows a lens arrangement of a compact zoom lens system at a wide-angle extremity, according to a third embodiment of the present invention.

Figures 10A, 10B, 10C, 10D, 10E:
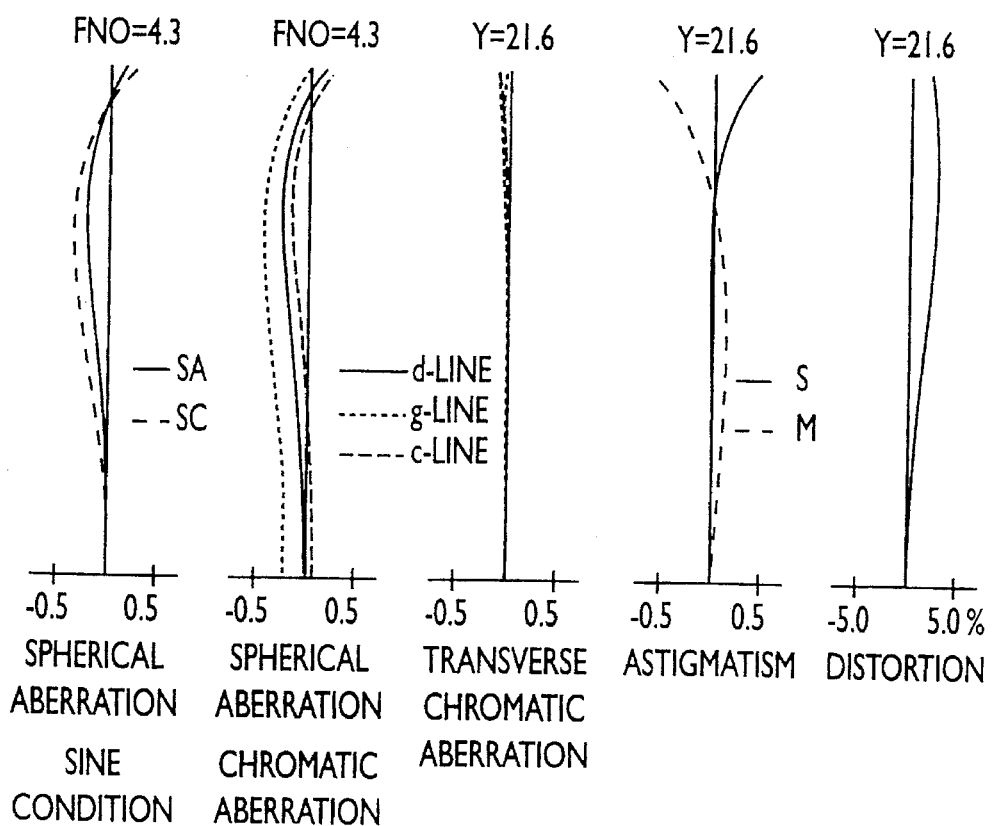
FIG. 10 shows various aberration diagrams of a small zoom lens shown in FIG. 9.

Numerical data for the lens system shown in FIG. 9 is shown in Table 3 below. Diagrams of various aberrations thereof at the wide-angle extremity, a standard position and a telephoto extremity are shown in FIGS. 10, 11 and 12, respectively.

TABLE 3

$F_{NO} = 1:4.3-6.0-9.2$
$f = 36.25-50.00-77.12$
$\omega = 30.3-23.0-15.6$
$f_B = 10.79-22.05-44.27$
$Y = 21.6$

| surface NO | r | d | N | ν |
|---|---|---|---|---|
| 1 | 15.874 | 2.05 | 1.64769 | 33.8 |
| 2 | 27.552 | 1.50 | — | — |
| 3 | −12.423 | 1.20 | 1.84666 | 23.8 |
| 4 | −29.567 | 1.26 | — | — |
| 5 | −126.465 | 2.31 | 1.48749 | 70.2 |
| 6 | −12.481 | 0.10 | — | — |
| 7 | 88.929 | 2.99 | 1.56732 | 42.8 |
| 8 | −7.885 | 1.40 | 1.83481 | 42.7 |
| 9 | −15.094 | 8.70–5.70–2.92 | — | — |
| 10⋇ | −36.528 | 2.22 | 1.58547 | 29.9 |
| 11 | −23.035 | 4.08 | — | — |
| 12 | −8.030 | 1.40 | 1.80400 | 46.6 |
| 13 | −25.766 | — | — | — |

⋇marked surface is aspherical.

TABLE 3-continued $F_{NO} = 1:4.3-6.0-9.2$
$f = 36.25-50.00-77.12$
$\omega = 30.3-23.0-15.6$
$f_B = 10.79-22.05-44.27$
$Y = 21.6$

| surface NO | r | d | N | ν |
|---|---|---|---|---|

NO. 10: $K = 0.0$, $A4 = 0.11987 \times 10^{-3}$, $A6 = 0.20391 \times 10^{-5}$, $A8 = 0.0$ $A10 = 0.0$ $A12 = 0.0$

Fourth Embodiment

FIG. 13 shows a lens arrangement for a compact zoom lens system at a wide-angle extremity, according to a fourth embodiment of the present invention.

Numerical data of the lens system shown in FIG. 13 is shown in Table 4 below. Diagrams of various aberrations thereof at the wide-angle extremity, a standard position and a telephoto extremity are shown in FIGS. 14, 15 and 16, respectively.

TABLE 4

$F_{NO} = 1:4.3-6.0-9.2$
$f = 36.25-50.00-77.12$
$\omega = 30.2-22.9-15.6$
$f_B = 10.95-22.32-44.76$
$Y = 21.6$

| surface NO | r | d | N | ν |
|---|---|---|---|---|
| 1 | 17.287 | 2.09 | 1.58144 | 40.7 |
| 2 | 39.900 | 1.45 | — | — |
| 3 | −11.614 | 1.21 | 1.84666 | 23.8 |
| 4 | −24.913 | 0.53 | — | — |
| 5 | −53.340 | 3.51 | 1.50137 | 56.4 |
| 6 | −11.525 | 0.10 | — | — |
| 7 | 66.393 | 3.30 | 1.56732 | 42.8 |
| 8 | −8.775 | 1.40 | 1.88300 | 40.8 |
| 9 | −16.900 | 8.86–5.72–2.81 | — | — |
| 10⋇ | −51.616 | 2.42 | 1.58547 | 29.9 |
| 11 | −24.750 | 3.82 | — | — |
| 12 | −8.580 | 1.40 | 1.80400 | 46.6 |
| 13 | −34.500 | — | — | — |

⋇marked surface is aspherical.
NO. 10: $K = 0.0$, $A4 = 0.10806 \times 10^{-3}$, $A6 = 0.13594 \times 10^{-5}$, $A8 = 0.15123 \times 10^{-8}$, $A10 = 0.0$ $A12 = 0.0$ The values of the formulae (1) through (7) in the first, second, third and fourth embodiments are shown in Table 5 below.

TABLE 5

|  | example 1 | example 2 | example 3 | example 4 |
|---|---|---|---|---|
| Formula (1) | 2.21 | 2.09 | 2.28 | 2.10 |
| Formula (2) | 3.46 | 3.47 | 3.51 | 3.45 |
| Formula (3) | 1.03 | 0.846 | 0.768 | 0.981 |
| Formula (4) | 0.0081 | 0.0097 | 0.0081 | 0.0077 |
| Formula (5) | −2.51 | −2.44 | −2.41 | −2.49 |
| Formula (6) | 0.1 | 0.1 | 0.1 | 2.0 |
| Formula (7) | 0.267 | 0.267 | 0.267 | 0.316 |

As can be seen from Table 5 above, all four embodiments satisfy the requirements defined by the formulae (1) through (7). Moreover, according to the present invention, the variable power is more than 2.1 and the telephoto ratio at the telephoto extremity is below 0.9. In addition, the aberrations are correctly compensated.

As may be understood from the above discussion, according to the present invention, in a lens system comprised of a first lens group having a positive refractive power and a second lens group having a negative refractive power, a compact and small zoom lens whose magnification and telephoto ratio are above 2.1 and below 0.9, respectively can be obtained.

I claim:

1. A zoom lens comprising:

a first lens group having a positive refractive power and a second lens group having a negative refractive power, arranged in this order from an object side, said first and said second lens groups capable of moving to change their spatial distance in carrying out a zooming operation;

said second lens group comprises a first positive meniscus lens with a concave surface located adjacent to an object to be photographed, and a second negative lens with a concave surface located adjacent to an object to be photographed, arranged in this order from the object side;

and the following relationships are satisfied:

(1) $1.9 < f_w/r_1$
(2) $3.4 < f_T/f_1 < 4$
(3) $0.5 < f_T/f_{2-1} < 1.2$ wherein $f_w$ represents a focal length of the whole lens system at a wide-angle extremity;

$r_1$ represents a radius of curvature of the surface of a first lens of said first lens group, located adjacent to the object to be photographed;

$f_T$ represents a focal length of the whole lens system at a telephoto extremity;

$f_1$ represents a focal length of the first lens group;

$f_{2-1}$ represents a focal length of the first lens of the second lens group.

2. A zoom lens according to claim 1, wherein said first lens of said second lens group is made from a material such as plastic and said first lens has an aspheric surface.

3. A zoom lens according to claim 2, wherein said aspheric surface of said first lens of said second lens group is located adjacent to an object to be photographed and the following relationships are satisfied:

$$0.005 < \Delta X_1/f_w < 0.012 \quad (4)$$

$$-2.8 < f_T/f_{2-2} < -2.1 \quad (5)$$

wherein $\Delta X_1$ represents an amount of aspheric deviation of said lens surface of said first lens of said second lens group that is located adjacent to an object to be photographed at a largest radius within an effective area of the lens;

$f_{2-2}$ presents a focal length of the second lens of the second lens group.

4. A zoom lens according to claim 1, wherein said first lens group comprises a first lens made of a positive meniscus lens whose convex surface is located adjacent to an object to be photographed, a second lens made of a negative meniscus lens whose concave surface is located adjacent to an object to be photographed, a third lens made of a positive lens having a larger convex surface curvature located adjacent to an image surface on which an image is to be formed, and a cemented lens consisting of a fourth positive lens and a fifth negative lens, arranged in this order from the object side.

5. A zoom lens according to claim 4, the following relationships are satisfied:

$$-10 < v_{1-4} - v_{1-5} < 10 \quad (6)$$

$$n_{1-5} - n_{1-4} > 0.2 \quad (7)$$

wherein $v_{1-4}$ represents an Abbe number of said fourth lens belonging to said first lens group;

$v_{1-5}$ represents an Abbe number of said fifth lens belonging to said first lens group;

$n_{1-5}$ represents a refractive index of said fifth lens of said first lens group at a d-line;

$n_{1-4}$ represents a refractive index of said fourth lens of said first lens group at a d-line.

6. The zoom lens according to claim 1, said second lens group consisting of two lenses.

* * * * *

UNITED STATES PATENT AND TRADEMARK OFFICE
CERTIFICATE OF CORRECTION

PATENT NO. : 5,570,235
DATED : October 29, 1996
INVENTOR(S) : Shuji YONEYAMA

It is certified that error appears in the above-indentified patent and that said Letters Patent is hereby corrected as shown below:

At column 10, line 7 (claim 3, line 8), change "$AX_1$" to ---$\Delta X_1$---.

At column 10, line 11 (claim 3, line 12), change "presents" to ---represents---.

Signed and Sealed this

Fifteenth Day of July, 1997

Attest:

BRUCE LEHMAN

*Attesting Officer*     *Commissioner of Patents and Trademarks*